Jan. 19, 1965 W. L. MORRISON 3,166,425
METHOD FOR FREEZING COOKED FOODS
Filed April 22, 1960 3 Sheets-Sheet 1
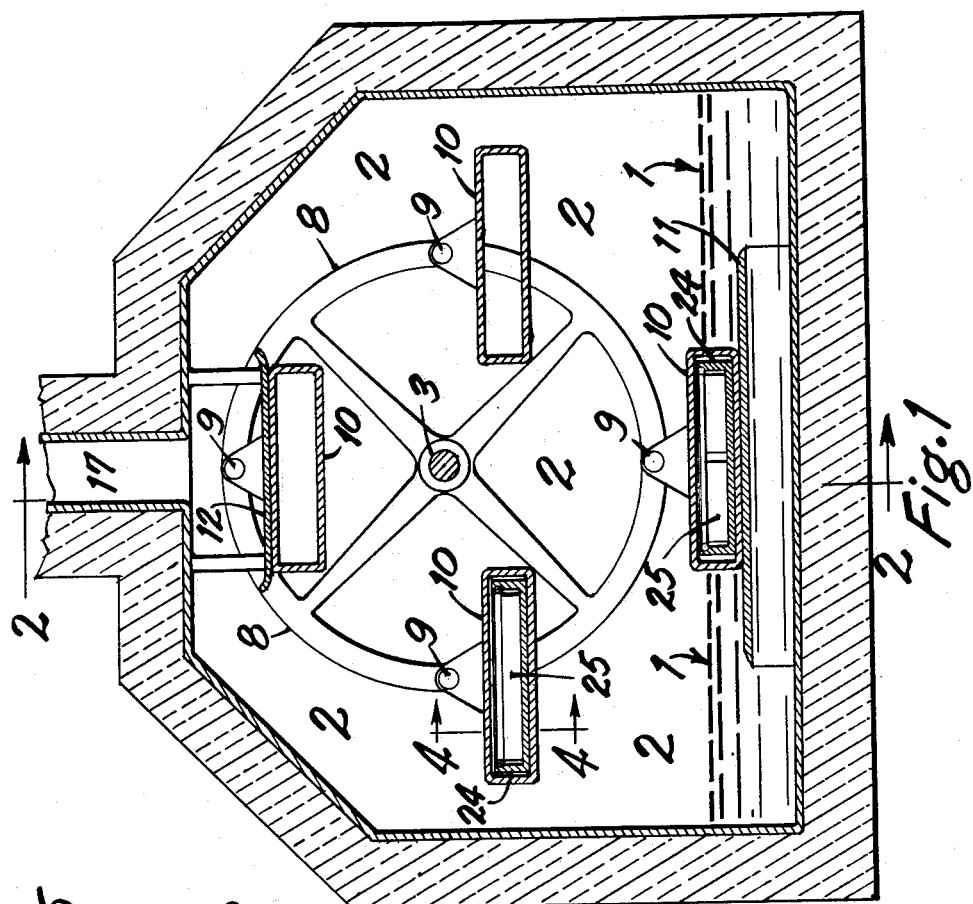
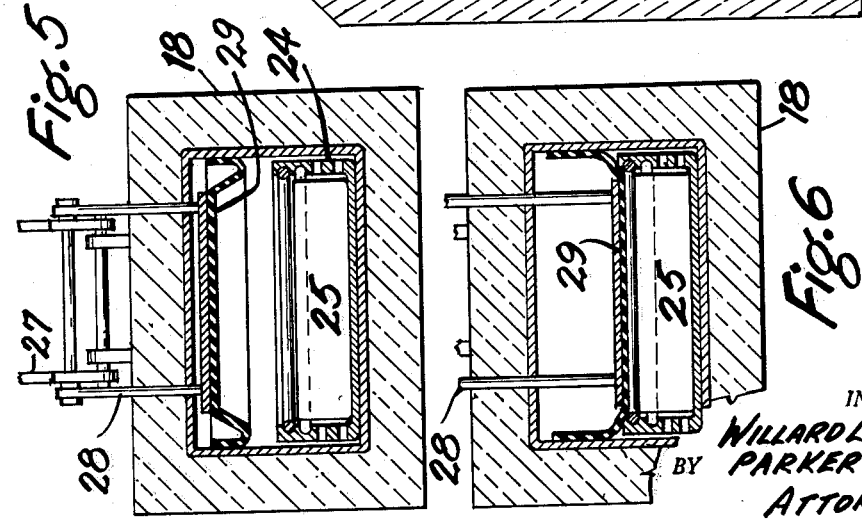
INVENTOR.
WILLARD L. MORRISON
BY PARKER & CARTER
ATTORNEYS

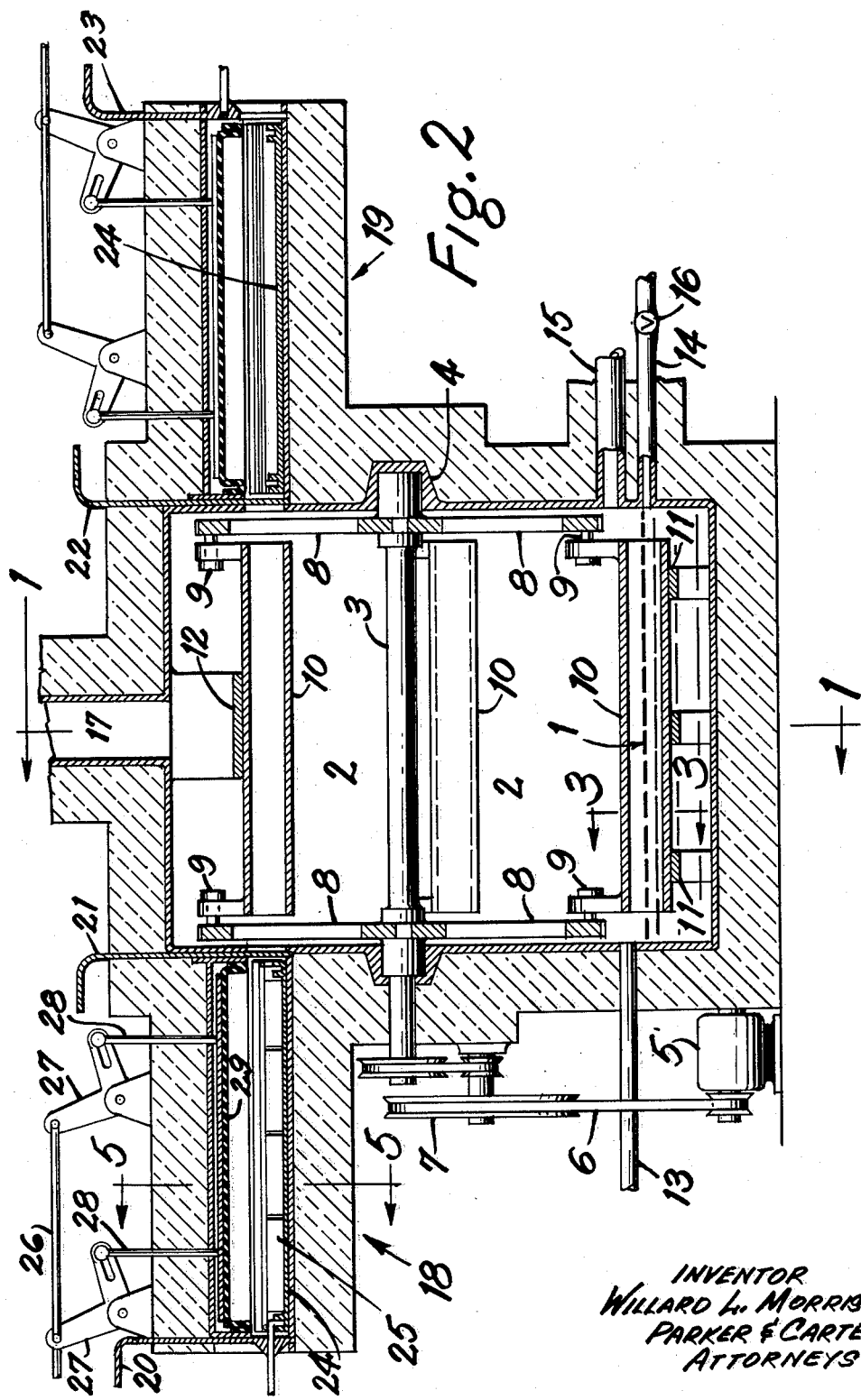

Jan. 19, 1965  W. L. MORRISON  3,166,425
METHOD FOR FREEZING COOKED FOODS
Filed April 22, 1960  3 Sheets-Sheet 3
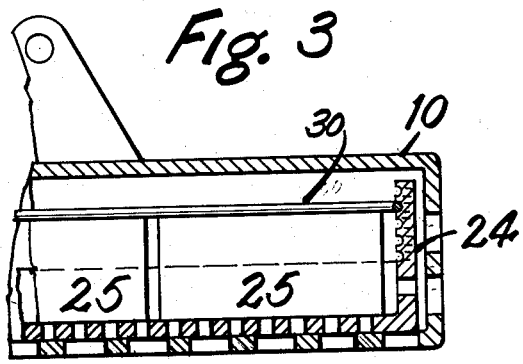
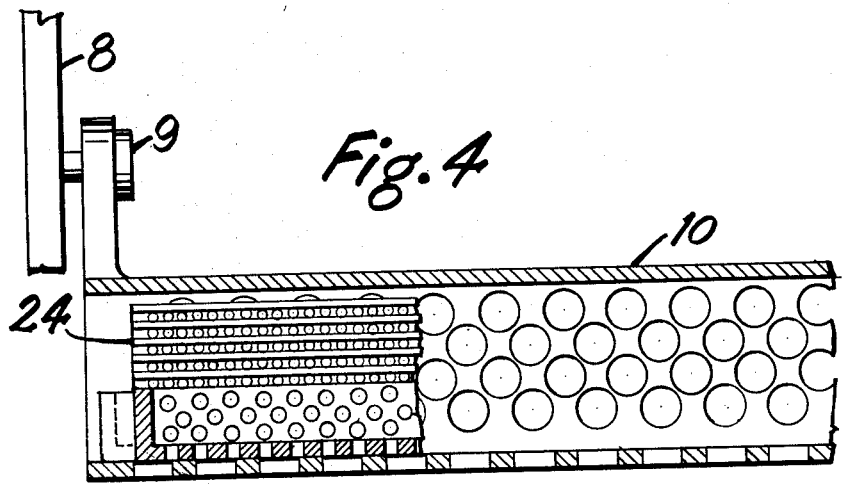
INVENTOR
WILLARD L. MORRISON
BY PARKER & CARTER
ATTORNEYS

United States Patent Office 3,166,425
Patented Jan. 19, 1965

3,166,425
METHOD FOR FREEZING COOKED FOODS
Willard L. Morrison, Lake Forest, Ill., assignor to Liquefreeze Company, Inc., New York, N.Y., a corporation of New York
Filed Apr. 22, 1960, Ser. No. 24,067
3 Claims. (Cl. 99—192)

This application is a continuation in part of my copending application Serial No. 852,496, filed November 12, 1959, now abandoned.

My invention relates to improvements in method of and apparatus for freezing cooked foods for shipment and storage.

One object of my invention is to provide a method of and apparatus for cooling and freezing liquid and solid cooked food.

The cooked food will be placed in open top metallic foil containers or pans, will be cooled and frozen in them, the containers being thereafter covered and then packed.

It is of the utmost importance that the freeze down of the foodstuff be exceedingly rapid for sanitary reasons and because rapid freeze down produces a minimum size crystallization of the liquids in the food and inhibits loss of essences.

In order to accomplish the rapid freeze down, I propose to use liquid nitrogen at approximately —320 degrees F., or any other liquid with a low boiling point that would not be harmful to food, relying in the main on latent heat by direct heat exchange between the liquid nitrogen and the food to freeze the latter.

The more of the liquid that can contact the food, the more rapid the freeze down and the most satisfactory solution of the problem is complete immersion in and complete contact between, the liquid and the food. Such contact is satisfactory when solid foods are frozen but when liquid foods, soups, thin stews and the like are to be frozen, the liquid nitrogen must not be mixed with the liquid food because such mixture might change the physical shape or properties of food, i.e., forming numerous small crystals.

Since both liquid and solid foods are to be frozen, I propose a method and apparatus which will be easily adaptable to the freezing of both types of food.

Solid foods will be packed in the metal containers and the entire container and contents will be immersed in a liquid nitrogen bath, the liquid nitrogen entering the open top container or pan and coming into contact with the food. When the pan is withdrawn from the bath, any remaining liquid nitrogen will evaporate and when the container is discharged, it contains only frozen food, unchanged in appearance.

When liquid foods are to be frozen, the liquid tight container will so to speak float on the surface of the bath and the liquid will not be allowed to enter it. Cooling results from heat transfer through the thin heat conductive aluminum foil of the container to the food and heat transfer between the surface of the liquid food and the cold gas boiled off from the liquid nitrogen.

In general, I propose a vessel closed to atmosphere to avoid waste of gaseous nitrogen, means for maintaining and controlling the level of a bath of liquid nitrogen in the vessel, means for recovering the gaseous nitrogen, reliquefying it and returning it to the bath. The gaseous nitrogen will pass out from the vessel under such control that there will be such pressure in the vessel as will prevent entrance of air to dilute the nitrogen. The cooked food in the aluminum foil containers may be placed on trays, carriages or other suitable means in the open and may then be fed into the vessel and successive groups of trays will be carried down to, and as the case may be, immersed in or floated on the liquid bath. One convenient way to control immersion or floating will be by controlling the level of the liquid in the bath. If solids are to be frozen down, the bath level will be such that each container will be immersed with its contents below the level of the liquid nitrogen. If, however, liquid foods are to be frozen, each container will only be partly immersed in the bath at a level such that the liquid nitrogen will not enter the container.

My invention is illustrated diagrammatically in the accompanying drawings, wherein—

FIGURE 1 is a diagrammatic vertical section along the line 1—1 of FIGURE 2;
FIGURE 2 is a section along the line 2—2 of FIGURE 1;
FIGURE 3 is a section on an enlarged scale along the line 3—3 of FIGURE 2;
FIGURE 4 is a longitudinal section through one of the baskets along the line 4—4 of FIGURE 1;
FIGURE 5 is a section along the line 5—5 of FIGURE 2;
FIGURE 6 is a similar section in different position.

Like parts are indicated by like numerals throughout the specification and drawings.

The insulated bath chamber 1 is at the bottom of a cold gas chamber 2. A main shaft 3 in the gas chamber rotates in bearings 4 and is driven by a motor 5 through belt 6 and speed reducing gear 7. Wheels 8 are carried by the shaft 3 and hanging on them on spaced pivot pins 9 are baskets 10 which travel Ferris wheel-wise in the chamber 2.

At bottom and top of the chamber are steady rest platforms 11 and 12, the platform 12 being so positioned that it may engage the top of a basket at its upper excursion, the steady rest 11 engaging the bottom of the basket 10 at the bottom of its excursion so that rocking of the baskets at upper and lower points is inhibited. 13 is a liquid supply pipe through which liquid nitrogen may be supplied to the chamber 1 from any suitable source. 14 and 15 are overflow pipes for liquid nitrogen, pipe 14 being controlled by a valve 16. When valve 16 is closed, liquid flows out through the pipe 15 from a bath of maximum depth. When valve 16 is open, liquid flows out through the pipe 14 and the bath depth is at a minimum. The exhaust duct 17 permits escape of gaseous nitrogen from the gas chamber. A feed tunnel 18 and discharge tunnel 19 comprising an inlet and outlet, respectively, for the chamber are in alignment and they are so positioned that they will be in alignment with the basket 10 when it is at the uppermost position in its excursion as the wheel rotates. Gates 20, 21, 22 and 23 are located at the ends of the tunnels 18 and 19 respectively and may be mechanically or manually operated as is desired. The basket 10 is foraminous, open at both ends. It contains an elongated foraminous tray 24 substantially the same length as the basket, there being in connection with the use of the apparatus, a multiplicity of these trays. Each tray is intended to be loaded with a plurality of pans or plates 25 which may contain cooked food, hot from the kitchen. When a tray is loaded, the valve 21 will be closed, the valve 20 open. The tray with its load will be fed into the tunnel. The valve 20 is then closed. When the rod 26 is moved to the right, the bell crank levers 27 force the pitman rods 28 downwardly to press the bellows 29 downwardly from the position shown in FIGURE 5 to the position shown in FIGURE 6. This squeezes out of the tunnel most of the air. The valve 20 is then closed, the valve 21 opened and the bellows moved back to the position of FIGURE 5, drawing cold nitrogen gas from the chamber 2 into the tunnel. The drive motor is stopped so that the basket 10 is in line with the tunnel and a push rod carried by the valve 20 is manually used to force the tray into register with and seated in the basket 10. The push rod is then withdrawn the bellows 29 pressed downwardly to expel the gaseous nitrogen, forcing it back into the cooling chamber, and the valve 21 is closed. As the first mentioned tray 24 is pushed into the basket 10, it pushes the tray previously in place out into the tunnel 19, the valve 22 being opened. The push rod being long enough makes it possible to push the second tray clear into register with the tunnel beyond the valve 22. The first tray is then pulled back into register with the basket, with valve 23 closed, the bellows is collapsed to force gaseous nitrogen from tunnel 19 back into chamber 2. Then valve 22 is closed and 23 is opened, the bellows is opened and the tray of cold food is withdrawn. Under some circumstances the push rod may be so long that each tray may be separately positioned in the basket or in the tunnels independent of one another. Thus opening and closing and purging of the two tunnels respectively and successively of air and gas is carried out in the same manner at each end of the system.

The liquid which is discharged through pipes 14 or 15 can be returned to the source of supply. The gas which escapes through the duct 17 can be reliquefied and returned with the liquid to the bath.

The Ferris wheel will then rotate, presenting another cage and its load of carriages and containers to the bath. This process continues step by step. Each carriage with its containers of cooked food will progress downwardly through the cold gas in the chamber 2 until it reaches the bath where it will come in contact with the bath liquid, cause it to boil with freezing of the food which has previously been precooled as it came down through the cold gas.

As each successive basket moves upwardly for discharge from the bath, its contents will continue to be exposed to the cold gas evaporated from the bath liquid, thus completing the chilling process.

Each pan or container being of foil or similar material is—except for its open top—liquid tight. The cradles, baskets or cages hang from the wheels and are foraminous. The trays or carriages are foraminous so that as the group of containers move downwardly toward the bath, they are directly exposed to contact with the gas and when they are presented to the bath, they also are directly exposed to contact with the liquid. The trays are of uniform size. The pans or containers 25 may vary in depth and a holding grid 30 may be inserted at various heights in the tray corresponding to the heights of the containers mounted therein so as to hold the containers to the bottom of the basket when they are imersed as the wheel rotates.

After the open top containers have been discharged from the discharge tunnel 19, they will be wrapped or packaged by conventional means.

The reason for the control of the level of the bath is that some containers need to be completely immersed, others should be partially immersed. When the bath is at its highest level, completely immersed containers will be treated. When it is at its lowest controlled level, containers partially immersed will be exposed only on their bottom and sides to the bath.

No matter what cooked food is involved, in the broad sense, the treatment is similar. In each case the food is cooled or frozen as a result of heat exchange between the food and liquid nitrogen at substantially atmospheric pressure. With respect to those foods which can be brought into direct contact with the liquid coolant such as solids, the shipping and storage trays are immersed with their food contents below the level of the liquid bath. With respect to those foods which it is not desirable to dilute even temporarily with the liquid nitrogen, the metallic container or pan is brought into contact with the liquid nitrogen, the top of the open pan being above the level of the liquid nitrogen so that nitrogen as liquid does not enter the pan. In this case, the pan floats on the surface of the bath, its depth of floating being positively controlled in consonance with the level of the bath so that the liquid nitrogen does not enter it.

I use the language "floating" or "dipping" interchangeably. By floating, I mean that the open top of the pan is always above the level of the bath. Dipping means the same thing. By "immersing" I mean the situation where the open top pan and contents are both forced below the level of the liquid.

I have used the term "substantially atmospheric pressure" to indicate the sharp differentiation between my invention and those inventions where a cold boiling liquid is used at substantial pressures. The liquid nitrogen or other cold boiling gas which boils at −320 degrees F. expands a great many times its liquid volume so some pressure will be built up in the chamber in which the bath is found as the gas evaporates and escapes or is withdrawn. But that pressure will be in the order of pressure of atmosphere and will require no special pressure resisting or pressure supporting container.

The gas exhaust or discharge duct will be of such size as to accommodate the maximum outflow of gas evaporated from the bath. A damper may be provided in that duct to maintain a controlled pressure just enough above atmospheric to avoid penetration of air into the cooling chamber. If the gas is to be recovered by reliquefaction and returned to the bath for reuse, the rate of withdrawal of the gas may be controlled by the reliquefying apparatus without reference to a damper to otherwise control the rate of flow but if the gas is to be wasted, then it becomes quite important to control the rate of outflow of the gas to maintain a sufficient pressure in the cooling chamber to exclude air.

I have now shown in detail means for moving the trays in and out. Any suitable hook and rod may be used or mechanical means may be provided, it being only necessary to insure that the fresh warm tray is pushed into the cradle or basket to expel the frozen tray and force it into the discharge tunnel and leaving it there at a point between the two valves when the fresh cool tray may be drawn back into proper position on the cradle.

Under ordinary circumstances, it is not permissible to treat different kinds of food in the same container. For instance, you do not mix chicken croquettes and fish in the same oven because as they heat up and aromatics are driven off, there is contamination of one by the other, and you would not think of frying doughnuts and shrimps in the same deep fat at the same time. This situation does not prevail when the foodstuff is to be immersed in a liquid nitrogen bath because as each food particle is immersed, boiling of the liquid results and there will, around the food object, interposed between it and the liquid, be a thin layer of the gas so that as long as the temperature differential between the food and the liquid prevails, there can be no direct contact of the liquid and food and the liquid cannot pick up any aroma from the food.

Since by cooling of the outer layers of the food particles a hard impervious frozen shell is immediately formed, there is no chance for the liquid to pick up any aroma from the food. Thus each particle goes in and comes out uncontaminated provided the food particles are each of them withdrawn from the bath while their temperature is sufficiently far above the temperature of the bath to insure this violent boiling off and continuous formation of the gas.

If a cooked chicken croquette at 100 degrees F. is immersed in the bath of liquid nitrogen, it may safely remain therein until the temperature of its outer layers are as high as −100 degrees F., the temperature of the interior of the croquette will be above that, but while the temperature of the outside is high enough above the temperature of the nitrogen, no contamination can occur.

With respect to fragments that might be knocked off or dropped off the food object and remain in the bath, there can be no contamination, as such particles are frozen down to the temperature of the bath, they are of glasslike hardness, unable to give any of their aromas to the bath.

I have used the term "separate food bodies" to cover in general the various types of food which are frozen for storage. A food body might be a chicken croquette, a clam, a piece of meat, a part of a fowl or it might be a stew in one of the metal pans so frequently seen in the cold storage service counters or it might be a pan full of peas or vegetables. The point is, I am dealing primarily with food assembled in portions and by the term "bodies" I mean such distribution and arrangement of foodstuff. The pan or receptacle is the unit in which such body or bodies of food are prepared for freezing and storage.

I prefer liquid nitrogen as the coolant but under some circumstances, other coolants, non-deleterious to foods, might be used and where I have used the term liquid nitrogen, I have used it for convenience to refer to a low boiling point coolant which can be used in contact with the food.

The apparatus being self-contained so far as the liquid and gas is concerned, may be operated in a room and men may work in the room around the apparatus even though the gas therein may not support life. The apparatus is arranged to inhibit the escape of gas to the operating room area around the apparatus and to inhibit the entrance of air to the apparatus so that food may be inserted and removed without danger of contamination of the working atmosphere around the machine or the cooling atmosphere in the machine.

I claim:
1. The method of preparing cooked solid foods for storage and shipment which comprises the steps of housing liquid nitrogen within a chamber having an inlet portion and an outlet portion in communication with said chamber above the liquid nitrogen level, introducing said cooked solid food into the inlet portion, sealing off the inlet portion from communication with said chamber, expelling a substantial proportion of the air from said inlet portion, sealing off the inlet portion from communication with the atmosphere, placing said inlet portion into communication with said chamber thereby to expose said foods to gaseous nitrogen from within the chamber, advancing said foods from the inlet portion into the chamber, exposing the foods in said chamber to heat exchange with the liquid nitrogen in said chamber while maintaining said chamber at substantially atmospheric pressure to reduce the temperature of the foods to below the freezing point, advancing the frozen foods to the outlet portion, expelling a substantial proportion of nitrogen gas accompanying said foods into said outlet portion for return of nitrogen gas to said chamber, sealing off the outlet portion from said chamber, and removing the frozen foods from said outlet portion.

2. A method as claimed in claim 1 wherein said foods are disposed in separate open-topped pans when introduced into said inlet portion and during passage through said chamber.

3. The method of preparing cooked foods of liquid consistency for storage and shipment which comprises the steps of packaging said cooked liquid foods in a fluid impervious enclosure of high heat conductivity, housing liquid nitrogen within a chamber having an inlet portion and an outlet portion in communication with said chamber above the liquid nitrogen level, introducing said enclosed foods into the inlet portion, sealing off the inlet portion from communication with said chamber, expelling a substantial portion of the air from said inlet portion, sealing off said inlet portion from communication with the atmosphere, communicating said inlet portion with the chamber thereby to expose said enclosed foods to gaseous nitrogen from within the chamber, advancing said enclosed foods from the inlet portion into chamber, exposing the enclosed foods in said chamber to heat exchange with the liquid nitrogen in said chamber, while maintaining said chamber at substantially atmospheric pressure to reduce the temperature of the enclosed foods to below the freezing point, advancing the frozen foods to the outlet portion, expelling a substantial proportion of nitrogen gas accompanying said foods into said outlet portion for return of nitrogen gas to the chamber, sealing off the outlet portion from said chamber, and removing the frozen foods from said outlet portion.

References Cited by the Examiner
UNITED STATES PATENTS

| | | | |
|---|---|---|---|
| 1,817,890 | 8/31 | Birdseye | 99—198 X |
| 1,969,833 | 8/34 | Beard | 62—104 |
| 2,059,970 | 11/36 | Robillard. | |
| 2,137,902 | 11/38 | Walter. | |
| 2,447,249 | 8/48 | Hill. | |
| 2,484,297 | 10/49 | Klein | 62—104 |
| 2,522,221 | 9/50 | Gorton | 99—192 |
| 2,529,388 | 11/50 | Hammond et al. | 99—192 |
| 2,831,329 | 4/58 | Morrison. | |

A. LOUIS MONACELL, *Primary Examiner.*

ABRAHAM H. WINKELSTEIN, HYMAN LORD,
*Examiners.*